US007889947B2

(12) United States Patent
Ofek et al.

(10) Patent No.: US 7,889,947 B2
(45) Date of Patent: Feb. 15, 2011

(54) IMAGE COMPLETION

(75) Inventors: Eyal Ofek, Redmond, WA (US); Yonatan Wexler, Redmond, WA (US); Billy Puoshuo Chen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 11/769,450

(22) Filed: Jun. 27, 2007

(65) Prior Publication Data

US 2009/0003702 A1  Jan. 1, 2009

(51) Int. Cl.
G06K 9/32 (2006.01)
G06K 9/40 (2006.01)

(52) U.S. Cl. .................. 382/294; 382/254; 382/302; 358/3.26

(58) Field of Classification Search ............. 382/254, 382/276, 278, 282, 284, 294, 302, 305; 358/3.26
See application file for complete search history.

(56) References Cited

U.S. PATENT DOCUMENTS

| 4,698,843 | A | 10/1987 | Burt |
| 5,327,262 | A | 7/1994 | Williams |
| 5,623,558 | A | 4/1997 | Billawala |
| 6,233,364 | B1 * | 5/2001 | Krainiouk et al. ............ 382/275 |
| 6,587,592 | B2 * | 7/2003 | Georgiev et al. ............ 382/254 |
| 6,654,488 | B1 | 11/2003 | Behun |
| 6,748,121 | B2 | 6/2004 | Kim |
| 6,865,289 | B1 | 3/2005 | Berestov |
| 7,012,624 | B2 * | 3/2006 | Zhu et al. .................... 345/639 |
| 7,027,620 | B2 | 4/2006 | Martinez |
| 2003/0039402 | A1 * | 2/2003 | Robins et al. ............... 382/275 |
| 2003/0118249 | A1 * | 6/2003 | Edgar .......................... 382/275 |
| 2003/0210828 | A1 * | 11/2003 | Georgiev et al. ............ 382/254 |
| 2005/0129324 | A1 * | 6/2005 | Lemke ....................... 382/254 |
| 2006/0285762 | A1 | 12/2006 | Sun |

FOREIGN PATENT DOCUMENTS

WO  WO2005101324 A1  10/2005

OTHER PUBLICATIONS

Jianning Wang, et al. "Filling Holes on Locally Smooth Surfaces Reconstructed from Point Clouds", Elsevier Science, Sep. 8, 2005, pp. 16, Center for Visual Computing and Computer Science Dept., Stony Brook University, Stony Brook, New York.

(Continued)

*Primary Examiner*—Manav Seth
(74) *Attorney, Agent, or Firm*—Shook, Hardy & Bacon L.L.P.

(57) ABSTRACT

A computer-implemented method and media for completing images are provided. The computer-implemented method receives images having holes, identifies the holes, and searches an image database to locate images that fill the holes. Also, the computer-implemented method generates a multi-scale graph of the image to locate images that fill the holes at different resolutions. A guide image may filter the located images that fill the holes at the different resolutions. The images that fill the holes and match the guide are selected to complete the images.

20 Claims, 17 Drawing Sheets

OTHER PUBLICATIONS

C. Ballester et al. "Filling-In by Joint Interpolation of Vector Fields and Gray Levels", Dec. 10, 2000, pp. 30, Dept. de Tecnologia, University of Pompeu-Fabra, Passeig de Circumvalacio, 8, 08003 Barcelona, Spain.

Zinovi Tauber et al. "Review and Preview: Disocclusion by Inpainting for Image-based Rendering", Systems, Man and Cybernetics, Part C: Applications and Reviews, IEEE Transaction on, pp. 527-540, Jul. 2007, vol. 37, Issue 4, Czech Technical University. Czech Republic.

Vladimir Kolmogorov, "Convergent Tree-Reweighted Message Passing for Energy Minimization", IEEE Transactions on Pattern Analysis and Machine Intelligence, vol. 28, No. 10, Oct. 2006.

Nikos Komodakis and Georgios Tziritas, "Image Completion Using Global Optimization", Computer Science Dept., University of Crete, 2006.

Alexei A. Efros et al., "Texture Synthesis by Non-parametric Sampling", Computer Science Division, University of California, Berkeley, IEEE International Conference on Computer Vision, 1999.

Jian Sun et al., "Image Completion with Structure Propagation", SIGGRAPH 2005, vol. 24, pp. 861-868. (Video 56M).

Iddo Drori et al.,"Fragment-Based Image Completion", School of Computer Science, Tel Aviv University, 2003, pp. 303-312.

Marcelo Bertalmio et al. "Image Inpainting", 2000, Electrical and Computer Engineering, University of Minnesota pp. 417-424.

Anil N. Hirani et al., "Combining Frequency and Spatial Domain Information for Fast Interactive Image Noise Removal" 1996, Sony Corporation, pp. 269-276.

Alexei A. Efros et al, "Image Quilting for Texture Synthesis and Transfer", University of California, Berkely, Siggraph '01, Los Angeles, California, Aug. 2001, pp. 341-346.

Li-Yi Wei et al. "Fast Texture Synthesis using Tree-structured Vector Quantization", http://graphics.stanford.edu/papers/texture-synthesis-sig00/, ACM Press/Addison-Wesley Publishing Co., New York, NY, USA, 2000.

Aaron Hertzmann et al., "Image Analogies", NYU Media Research Lab, NY, NY, USA, http://www.mrl.nyu.edu/publications/image-analogies/, 2001.

A. Criminisi et al. "Region Filling and Object Removal by Exemplar-Based Image Inpainting", IEEE Transactions on Image Processing, vol. 13, No. 9, Sep. 2004.

Alexandru Telea, "An Image Inpainting Technique Based on the Fast Marching Method", Eindhoven University of Technology, The Netherlands, vol. 9, No. 1: 25-36, May 21, 2003.

* cited by examiner

IMAGE COMPLETION

BACKGROUND

Conventionally, an incomplete image is fixed manually by a user or by automated image completion. A conventional image editing system allows the user to view the incomplete image and to edit the image by applying manual fixes that adjust images properties to complete the image. The manual fixes applied to the image may alter the quality of the image and may introduce artifacts, i.e., color or line faults that negatively impact the visibility of the image. The user of the conventional image editing system may not have the knowledge or experience to fix the image without accidentally introducing user-created artifacts into the image.

The conventional image editing system may reduce the introduction of user-created artifacts when completing an image by providing the automated image completion. The automated image completion may sample a local region of the image to obtain pixel values that are averaged to generate pixel values for filling the hole. The automated image completion generates a smooth interpolation of the hole in the image based on the generated pixel values. The smooth interpolation for the hole comprises pixel values, which are the average of the pixels values on either side of the hole. Similar to the manual fixes for image completion, the automated image completion introduces system-generated artifacts. The system-generated artifacts and user-created artifacts impact the visibility of the image and may be unacceptable to some users.

SUMMARY

To reduce the likelihood of system-generated and user-created artifacts, other images that contain similar content may be utilized by an image completion system to complete an image having holes. The other images are stored in a database that is connected to an image completion system that receives images having holes. The image completion system may also receive guide images that represent content that should be utilized to fill the hole. A computer-implemented method executed by the image completion system completes the images by locating matches between the received images having the holes, the other images stored in the database, or the guide images. The computer-implemented method may generate a multiscale graph that completes the holes in the images based on a hierarchical optimization of similarity between the images having holes, the database images, or the guide images.

This Summary is provided to introduce a selection of concepts in a simplified form. The selection of concepts are further described below in the Detailed Description. This Summary is not intended to identify key features or essential features of the claimed subject matter, nor is it intended to be used as an aid in determining the scope of the claimed subject matter.

DETAILED DESCRIPTION

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

As utilized herein, the term "guide image," refers to an image, a video frame, a portion of an image, or a video frame that contains content that is similar to missing content of an image having a hole or content for filling the hole. Also, as utilized herein, the term "hole" refers to an area missing image information, i.e. pixel data, or an area specified by a user as a region that needs replacing.

An image completion system receives images from an image database or guide images to complete images that have holes. The holes in the images may be marked by a user or the image completion system may identify the location of the holes in the images. The image completion system processes the images having the holes to locate matching images in the image database. The matching images in the database are positioned to cover portions of the holes in the images. The matching images are layered and combined to cover the holes in the images. In some embodiments, the image completion system compares the matching images to the guide images, specified for the images having the holes, to select matching images that have a high degree of similarity to the guide image. The selected matching images are utilized by the image completion system to fill the holes in the images.

Accordingly, the image completion system allows a user to complete images having holes based on imaging information, i.e., pixel, luminance, color, gradients etc., associated with other images that represent content similar to missing content of the image, which forms the hole. Furthermore, the image completion system may use a guide image to ensure the other images utilized to complete the hole contain content that smoothly fills the hole without introducing unwanted artifacts. For instance, a user having a picture of the Statute of Liberty, where an object reduces the visibility of the Statute of Liberty, may utilize the image completion system to remove the object that blocks the Statute of Liberty.

Figure 1:
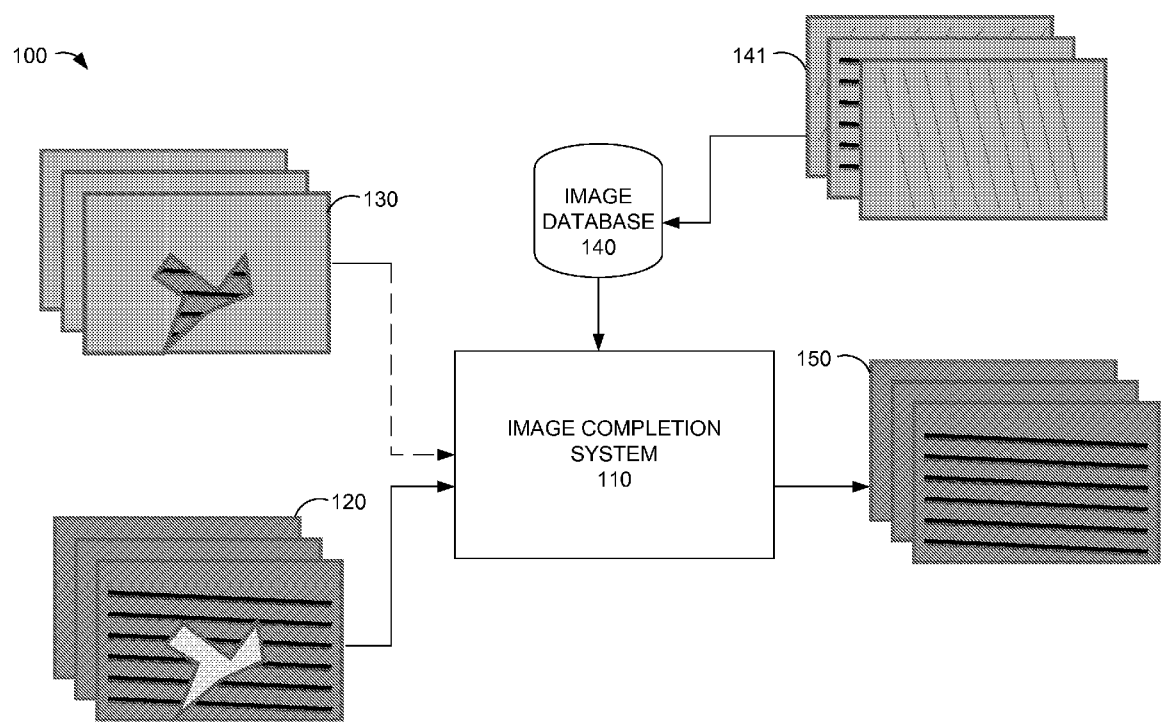
FIG. 1 is a network diagram that illustrates an exemplary operating environment.

FIG. 1 is a network diagram that illustrates an exemplary operating environment 100. The operating environment 100 includes an image completion system 110, images having holes 120, guide images 130, an image database 140 having database images 141, and completed images 150.

The image completion system 110 processes the images having holes 120 to complete the images having holes 120 by filling the holes with imaging information that removes the holes. The image completion system 110 receives the images having holes 120 from a variety sources. The sources may include, but are not limited to, a user, a specified storage location, a web database, or a storage location on a computer, laptop, or a storage location on a computing device. The images having holes 120 may be marked. When the images having holes 120 are unmarked, a user of the image completion system 110 marks each hole in the images having holes 120 to identify regions that should be replaced with other image information. Alternatively, the image completion system 110 may automatically identify holes in the images having holes 120 by locating regions of the images having holes 120 that are missing imaging information and marking the located regions as identified holes. Optionally, the image completion system 110 may receive guide images 130 to aid the image completion system 110 when selecting database images 141 to provide imaging information for filling the holes in the images having holes 120. The image completions system 110 is further described below with reference to FIG. 2.

The images having holes 120 are photographs, images, video frames, images captured by imaging devices, or other imaging data. The images having holes 120 include holes that are marked or unmarked. The image completion system 110 receives the images having holes 120 and completes the holes that are identified. The holes may be identified manually, where the user utilizes a freehand drawing device to mark regions in the images having holes 120, or automatically, where the image completion system 110 locates regions of the image having holes 120 missing imaging information and marks the located regions. In certain embodiments, the automatic hole identification feature of the image completion system is preselected by a user, when the image completion system is initialized. The images having holes 120 are further described below with reference to FIG. 3.

Optionally, the guide images 130 are utilized by the image completion system 110 to complete the images having holes 120. The user may provide the guide images 130 to aid the image completion system 110 when gathering imaging information from the database images 141 included in the image database 140 to fill the holes. The guide images 130 include, but are not limited to, user-drawn images, images from simulated three-dimensional drawings and other synthetically generated images, altered or unaltered portions of the images having holes 120, video frames, or satellite images. In some embodiments, the guide images 130 are provided by the user of the image completion system 110. In other embodiments, the guide images 130 are selected from the image database 140. The image completion system 110 utilizes the guide images 130 to reduce a number of matching images generated by the image completion system 110 based on a similarity between the images having holes 120 and the database images 141. In some embodiments, the image completion system 110 selects matching images, which have a high degree of similarity to the guide images 130 to cover portions of the holes included in the images having holes 120.

The image database 140 stores the database images 141. The database images 141 comprise images, video frames, or images that represent content similar to images having holes 120, where the images are captured at different angles, times, and resolutions. The image completion system 110 searches the image database 140 to locate matching images based on a similarity between the images having holes 120 and the database images 141. The matching database images 141 having a high degree of similarity to the images having holes 120 are utilized by the image completion system 110 to complete the images having holes 120.

The image completion system 110 fills the holes with imaging information extracted from the matching database images 141 to generate the completed images 150. The completed images 150 remove the holes from the images having holes 120. The completed images 150 may be displayed to the user of the image completion system.

One of ordinary skill understands and appreciates that the operating environment 100 has been simplified and that alternate arrangements are within the scope and spirit of this description.

In some embodiments, the image completion system includes an image engine that generates completed images for images having holes. The image engine may perform a single scale image completion or a multiscale image completion on the images having holes. The single scale image completion may generate complete images for the images having holes quicker than the multiscale image completion.

Figure 2:
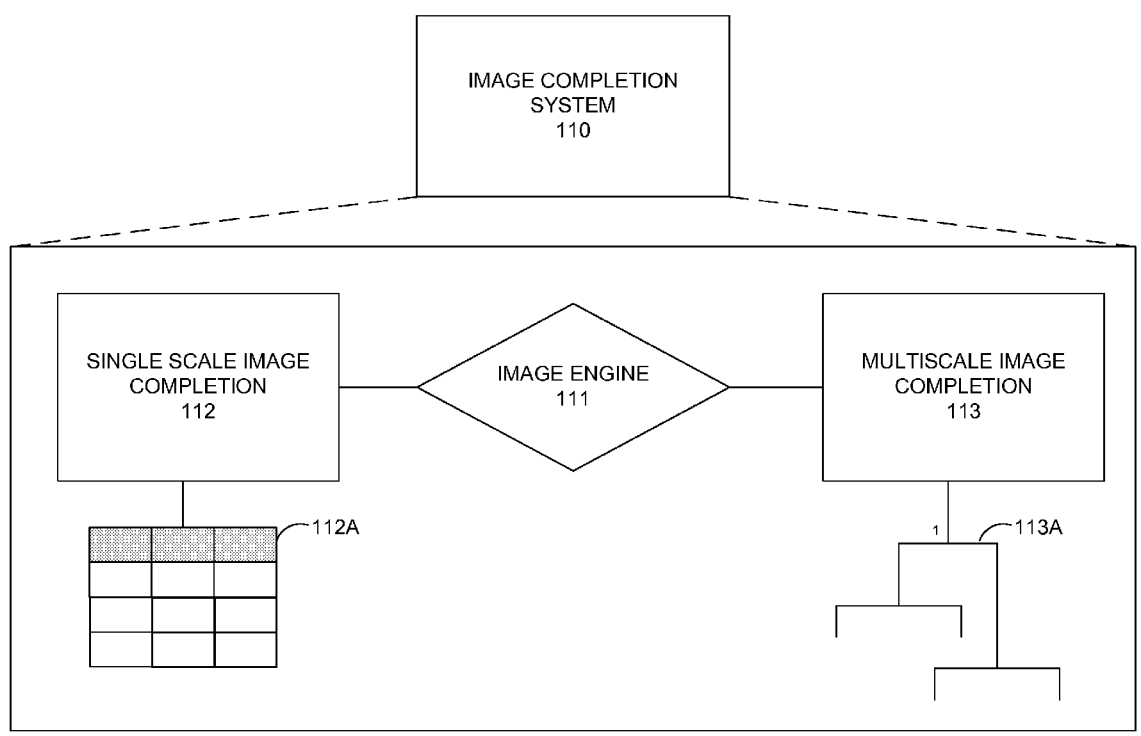
FIG. 2 is a component diagram that further illustrates the exemplary image completion system of FIG. 1.

FIG. 2 is a component diagram that further illustrates the exemplary image completion system 110 of FIG. 1. The image completion system 110 includes, among other things, an image engine 111 configured to generate complete images for each image having holes received by the image completion system 110.

The image engine 111 is configured to operate in at least two modes. In the first mode, the image engine 111 executes the single scale image completion 112 on the image having holes. In the second mode, the image engine 111 executes the multiscale image completion 113 on the image have holes. The image engine may switch between the first mode and the second mode based on input received from the user of the image completion system 110.

The single scale image completion 112 generates the complete image for the image having holes at a specified resolution. In some embodiments, the single scale image completion 112 completes the image by locating boundaries for each hole, and dividing the boundaries into blocks that are utilized to locate matching images for the image having holes. The blocks represent portions of the image that are proximate to the perimeter of each hole. The single scale image completion 112 may utilize a table 112A to store completion data for each block. Each hole in the image may have a table to store the completion data for each block associated with the hole. In the table 112A, each row is associated with a block, and each column of the row stores a matching image that has a high degree of similarity to the block. In some embodiments the images are stored based on similarity. Thus, the matching image in the first column has the highest degree of similarity among matching images in the row associated with that block. The image engine 111 may utilize the table 112A to generate a completed image by selecting a solution that covers the hole without introducing unwanted artifacts. The solution may include selecting a horizontal column, a diagonal column, or any other suitable combination, where one column is selected for each row. In some embodiments, the image engine 111 may determine an optimal solution for covering the hole based on a similarity between matching images associated with neighboring blocks. In some embodiments, the image engine 111 provides a solution for a complete image that maximizes the similarity between the matching images and the blocks, and the similarity between matching images across neighboring rows that represent neighboring blocks. In some embodiments, the table 112A does need have an equal number of columns for each row.

The multiscale image completion 113 also generates the complete image for the image having holes. The multiscale image completion 113 generates the complete image at varying resolutions. The image having holes is sampled by the image engine 111 to create different resolutions. The multiscale image completion 113 creates a multiscale graph 113A to represent the holes in the images and image location proximate to the holes at the varying resolutions. The multiscale graph 113A includes edges that connect image locations at the same resolution and image locations at different resolutions. The multiscale image completion 113 completes the image having holes by searching the image database to locate matching images that are similar to portions of the image associated with each image location at each level. Also, the image engine 111 selects the matching images, located by the multiscale image completion 113, that are similar to the guide image to fill the holes. In some embodiment, the image engine 111 generates an optimal solution for each resolution, beginning with the lowest resolution, via the multiscale graph 113A.

The image completion system may execute the single scale image completion on the images having holes to quickly generate a complete image. The image engine processes the images having holes to locate boundaries and to generate blocks along the boundaries. In turn, the blocks are utilized by the image completion system to locate matching images from an image database.

Figure 3:
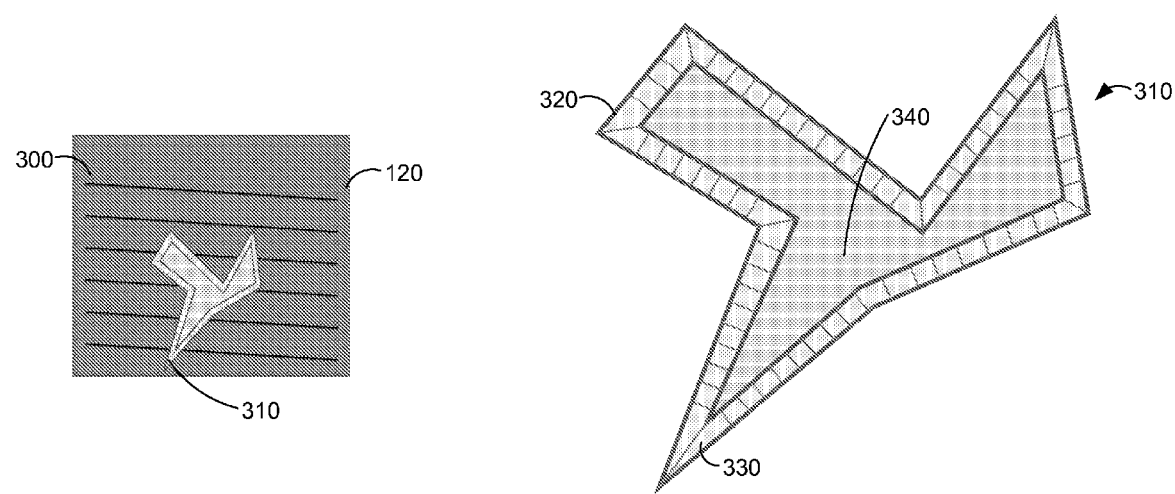
FIG. 3 is an image diagram that further illustrates the exemplary image having a hole depicted in FIG. 1.

FIG. 3 is an image diagram that further illustrates the exemplary images having holes 120 depicted in FIG. 1. The image engine in the image completion system receives the images having holes 120. The image having holes 120 includes image content 300 and a hole 310. The hole 310 represents an area missing image information, i.e. pixel data, or an area specified by a user as a region that needs replacing. The hole 310 may include a boundary 320 that includes blocks 330 that are proximate to the area 340 that is missing or needs replacing. The image engine processes the images having holes 120 to generate the boundary 320 and the blocks 330. The blocks 330 represent image information associated with the content 300 that is proximate to the area 340. The blocks 330 are processed by the single image completion to locate matching images similar to the content 300 represented by the blocks 330 and similar to neighboring blocks. The matching images are utilized by the image completion system to fill the area 340 and blocks 330 with the appropriate information. In some embodiments, the matching images are resized, layered, and combined to form the complete image.

In other embodiments, the image completion system shifts the matching images to cover holes in the images having holes based on similar image locations in the images having holes and the matching images. The image completion system positions the matching image to partially or completely cover the holes. Based on the number of matching images and the image locations, the image completion system generates a layered selection of matching images that completely covers the hole in the image.

Figure 4:
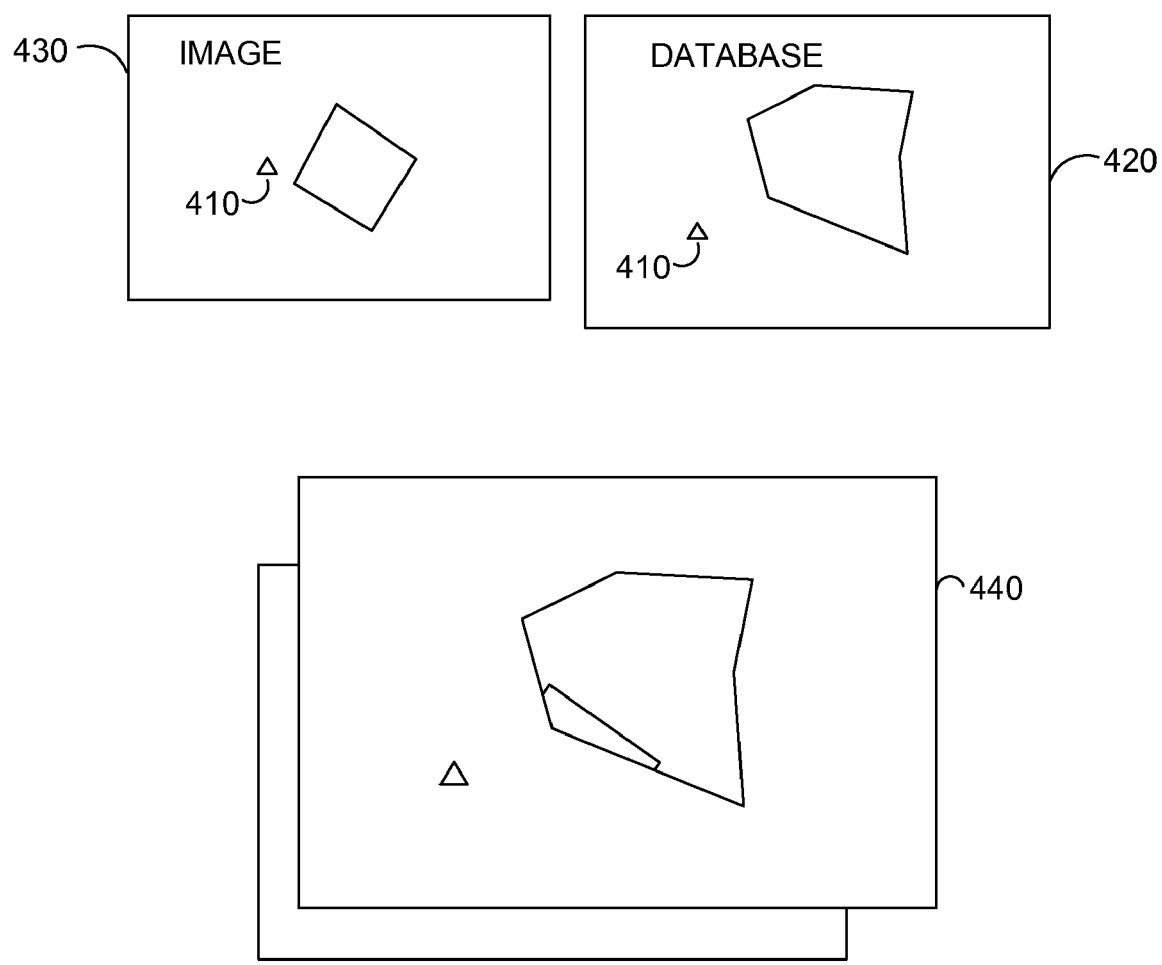
FIG. 4 is an image diagram that illustrates an exemplary match between an image having a hole and a database image.

FIG. 4 is an image diagram that illustrates an exemplary match between an image having a hole 430 and a matching database image 420. The image completion system generates a layered image 440 based on the image having a hole 430 and the matching database image 420. The image locations 410 in the matching database image 420 and the image having a hole 430 are compared, by the image completion system, to determine similarity between the content associated with the image locations 410. The similarity between content included matching database image 420 and content included in the image having a hole 430 or a guide image may be determined by a combination of similarity functions, including, but not limited to, a sum of squared difference between pixel values of the content associated with image location 410, correlation between pixel values of the content associated with image location 410, normalized correlation, and local orientation histograms executed by the image completion system. The image completion systems utilizes the image location 410 to calculate appropriate shifts for the matching database images 420 having a large degree of similarity to the image having a hole 430. In some embodiments, the image completion system is configured to ensure shifting the matching database images 420 to cover the holes in the image having a hole 430 satisfies similarity constraints locally, i.e., content surrounding the image location 410 at the same resolution are similar to the shifted matching database images 420, and globally, i.e. other overlapping content at different resolutions are similar to the shifted matching database images 420. The image completion system may utilize a multiscale graph 113A to determine whether local and global similarity constraints are satisfied when shifting the matching database image 420 and layering the image having a hole 430 and the matching database image 420 to generate the layered image 440.

In some embodiments, a multiscale graph 113A is generated by processing a high resolution image having holes. The multiscale graph 113A is a tree structure having levels that correspond to the varying resolutions of the high resolution image having holes that include nodes and edges that connect nodes at the same resolution and edges that connect nodes having different resolutions. At each level, image locations—which are proximate to a hole or inside the hole of the image having holes—are identified by the image completion system and utilized as nodes for the multiscale graph 113A. The image completion system may traverse the multiscale graph 113A in either a top-down approach, where each subsequent level has a higher resolution, or a bottom-up approach, where each subsequent level has a lower resolution.

Figure 5A:
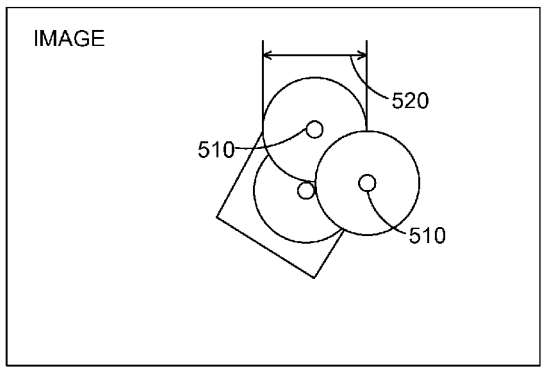
FIG. 5 is an image diagram that illustrates an exemplary collection of image locations.

FIG. 5 is an image diagram that illustrates an exemplary collection of image locations 510. In FIG. 5A, the image locations 510 of an image having holes at a specified resolution and the window size 520 of the image having holes are illustrated. The collection of image locations 510 in the image having holes are utilized, at each resolution associated with the image having holes, by the image completion system to generate a multiscale graph. The collection of image locations 510 may include image locations 510 that are in the hole or image locations 510 that correspond to the content of the image having holes. Each image location 510 has an associated sphere of influence that is configured as a window size 520.

In some embodiments, the image completion system independently selects image locations 510 for each level. The image completion system may generate a honeycomb distribution of image locations 510 across the varying levels of the image having holes. The honeycomb distribution of the image locations 510 provide an appropriate number of intra-level edges and inter-level edges and may reduce the introduction of artifacts when layering matching images that are similar to the image locations 510. In certain embodiments, the image completion system selects image locations 510 by selecting a subset of image locations that are half a window size 520 away from the hole. The subset of image locations may overlap based on a sphere of influence overlap threshold preselected in the image completion system. The honeycomb placement of image locations 510 creates a nonregular coverage of the holes in the images having holes. Alternatively, the placement of image locations 510 may include regular patterns, i.e. a grid, or cube. In other embodiments, the image completion system may utilize the image locations 510 selected in a previous level to select the same locations in subsequent levels. Each image location 510 represents a node of the multiscale graph.

Figure 5B:
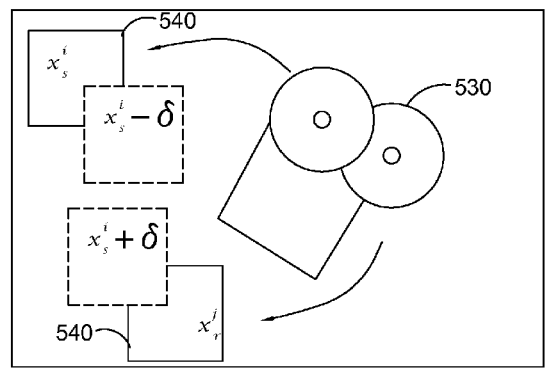

In FIG. 5B, the image locations 510 that overlap and matching images 540 are illustrated. The image locations 510 that overlap are utilized as edges of the multiscale graph. The edges are utilized to connect nodes that represent the image locations 510. In some embodiments, a weight assigned to the edge is based on the similarity between the contents associated with the image locations.

In other embodiments, the weight of the edge is based on the similarity of the matching images 540 associated with the image locations 510. The image completion system locates matching images 540 by searching the image database to select images based on a similarity to the contents associated with the image locations 510 or a guide image. The image completion system may select the matching images 540 based on the following similarity function: $\text{sim}(Lx_s^i, I_s) + \text{sim}(Lx_s^i, G_s)$, where L is the database of images, $G_s$ is the guide image, $I_s$ is the content at the image location 510 associated with the image having holes, s is the image location 510, i is the number of the images located in the image database, and $x_s^i$ is ith located image. The located images having the highest similarity are selected by the image completion system as matching images 540. When a located image ($x_s^i$) fails to overlap the image having holes, the image completion system does not evaluate the first term of the similarity function. When guide image ($G_s$) is not considered by the image completion system, $\text{sim}(Lx_s^i, G_s)$, a term of the similarity function is not evaluated by the image completion system. Accordingly, the image completion system locates matching images 540 based on the similarity function.

In some embodiments, image locations 510 of the image having holes processed by the image completion system may generate a small number of matching images 540. The image completion system may specify a minimum threshold for the number of matching images 540 for each image location 510. When the threshold is not satisfied, the image completion system may utilize a subset of the matching images 540 associated with a neighboring image location 510 to obtain a number of matching images that is above the specified minimum threshold, i.e., 20 matching images. Additionally, in some embodiments, each image location 510 having a parent image location 510 at another level receives all matching images 540 from the parent image location 510. The matching images 540 received from the parent image location 510 are reprocessed by the image completion system to calculate a similarity of the matching images 540 to content of image locations 510 in the current level.

The matching images may be utilized by the image completion system to calculate a weight for edges in the multiscale graph that connect nodes in the graph. The image completion system calculates the weight of the intra-level edges, based on a similarity between matching images 540 for the image locations 510 associated with nodes connected by the intra-level edge. The intra-level edge connects neighboring nodes at the same level. Additionally, the image completion system calculates the weight for inter-level edges based on a similarity between matching images 540 with image locations 510 at the level of node, connected by the edge, having the highest resolution. The inter-level edges connect parent node and child nodes at different levels. In an alternate embodiment, the matching images 540 may be compared, by the image completion system: at the level of the node, connected by the edge, having the lowest resolution; at the level of the child node connected to the edge; or at the level of the parent node connected to the edge. In certain embodiments, the weight assigned to the edge is based on the following determination: $\min\{\text{sim}(x_s^i, x_r^j+\delta), \text{sim}(x_r^j, x_s^i-\delta)\}$ where $\delta = s - r$. The r and s are image locations 510 associated with the nodes connected by the edge. The $x_s^i$ and $x_r^j$ are the matching images 540 for the image locations 510. The $\delta$ represents possible shifts to the matching image 540. The weight assigned to the edge is the lowest of the similarities between the connected matching images 540 and possible shifts to the matching images 540. The shifts are applied to position the matching images 540 over the hole in the image.

The image completion system utilizes the image locations, matching images, and the images having holes to generate a multiscale graph for selecting an optimal set of matching images that covers the hole without the introduction of artifacts. The graph is optimized based on a local similarity and a global similarity of the matching images for the image locations determined by the image completions system. The set of matching images are selected by the image completion system to cover the hole of the images having holes.

Figure 6:
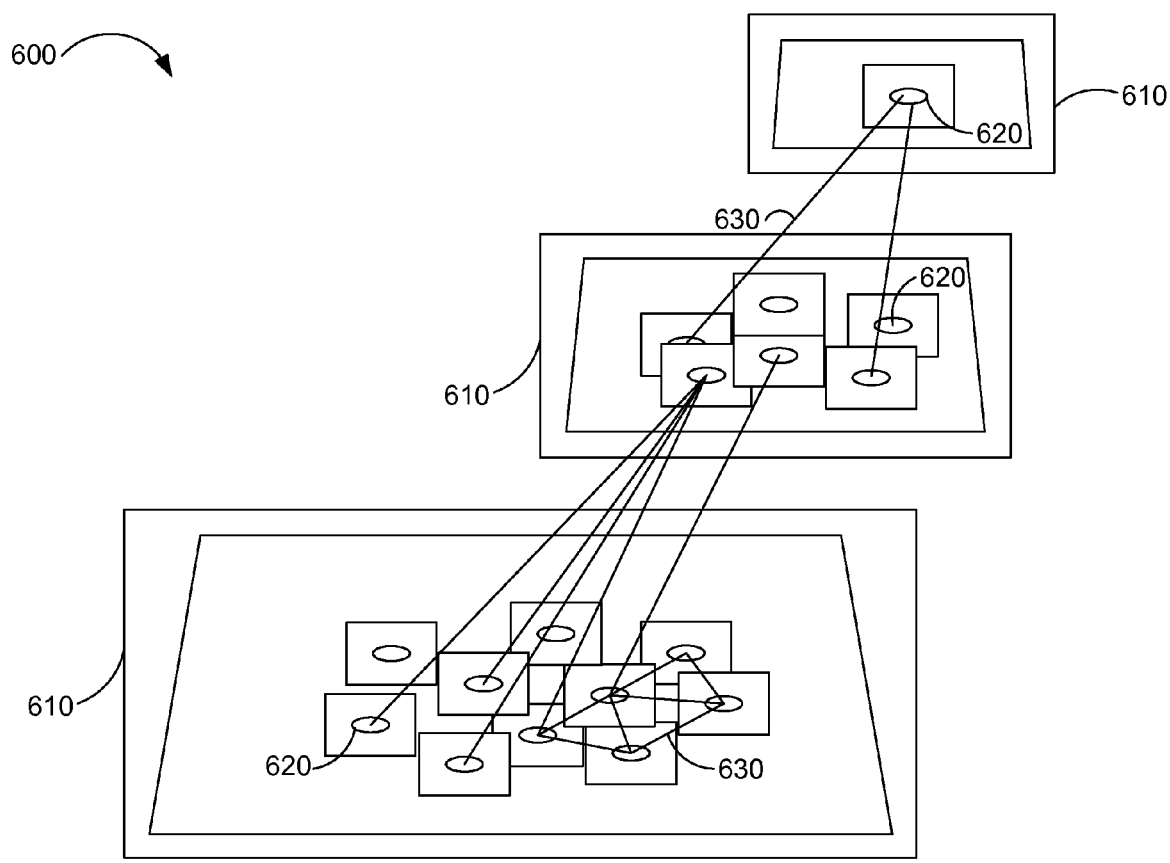
FIG. 6 is a graph diagram that illustrates an exemplary multiscale graph.

FIG. 6 is a graph diagram that illustrates an exemplary multiscale graph 600. The multiscale graph 600 is generated by the image completion system to select an optimal set of matching images. The multiscale graph 600 includes an image having holes 610. The image having holes 610 is sampled to generate varying resolutions of the image having holes. Each resolution of the image having holes represents a different level of the multiscale graph. The image having holes is processed by the image completion system to select image locations, which represent nodes 620 of the multiscale graph. The multiscale graph 600 includes edges 630 comprising intra-level edges and inter-level edges that connect the nodes 620. The intra-level edges connect nodes at the same level. The inter-level edges connect nodes at different levels. After the image completion system builds the multiscale graph 600, the set of optimal matching images is selected to cover the hole at each level in the multiscale graph. The image completion system maximizes both local and global similarities based on the set of matching images. The image completion system selects the set of matching images based on the optimization of $$\sum_s \Theta_s(x_s) + \sum_{s,r} \Theta_{s,r}(x_s, x_r),$$

where $\Theta_s$ is the local similarity function that compares matching images ($x_s$) to content associated with the image location s, i.e., $\text{sim}(I_s, Lx_s^i)$, and $\Theta_{s,r}$ is a similarity function that compares neighboring matching images ($x_s$ and $x_r$). At each level of the multiscale graph, the image completion system selects the matching images to optimize coverage of the holes, similarity between neighboring matching images, similarity between the matching images and the image content of the image having holes, and similarity between matching images at the different levels of the multiscale graph 600.

In some embodiments, the image completion system begins optimization with the level having the lowest resolution. The image completion system locates all matching images for the selected nodes 620, and optimizes the set of matching images to cover the hole in the image having holes 610. In the subsequent level of the multiscale graph 600, which has a higher resolution than the previous level, the image completion system receives all matching images and weights associated with the previous level. In turn, the image completion system optimizes the subsequent levels based on the matching images for the nodes 620 of the subsequent level and the matching images and weight from the previous level. The image completion system continues the optimization for each level until the multiscale graph 600 is completely traversed. Thus, the image completions system generates an optimal set of matching images for each level of the multiscale graph 600.

FIGS. 7-14 illustrate the results for the image completion system when operating in the multiscale completion mode.

Figure 7:
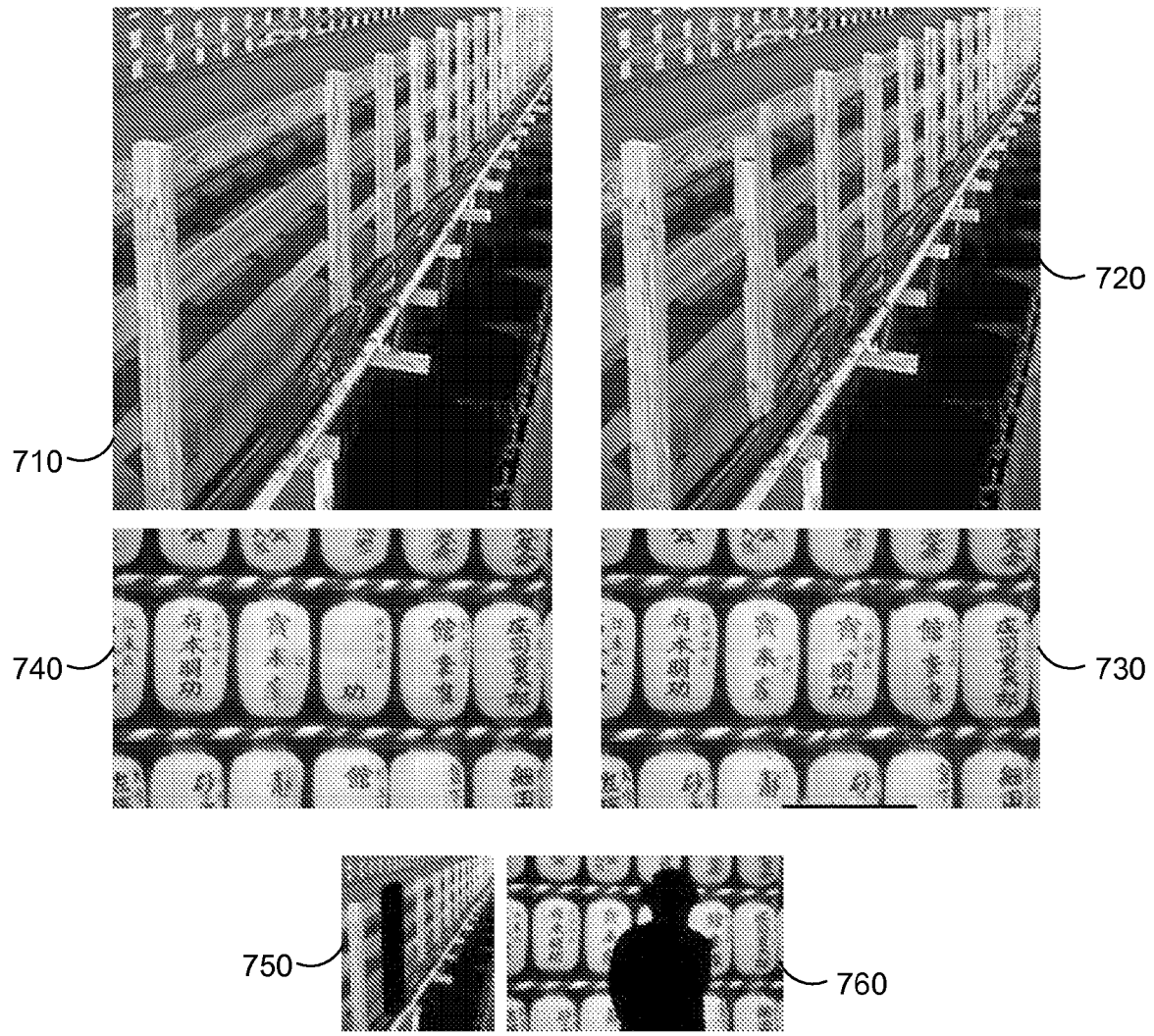
FIG. 7 is a screen shot that illustrates an exemplary image completion.

FIG. 7 is a screen shot that illustrates an exemplary image completion. Images 750 and 760 are images having holes that require completion. The images are sent to a conventional image editing application and the image completion system to generate completed images. Image 710 and 740 are illustrations of the complete images generated by the conventional automatic completion in a conventional image editing application. Images 720 and 730 are illustrations of the complete images generated by multiscale image completion performed by the image completion system. The results of the multiscale image completion provides a better completed image than the conventional automatic completion.

Figure 8:
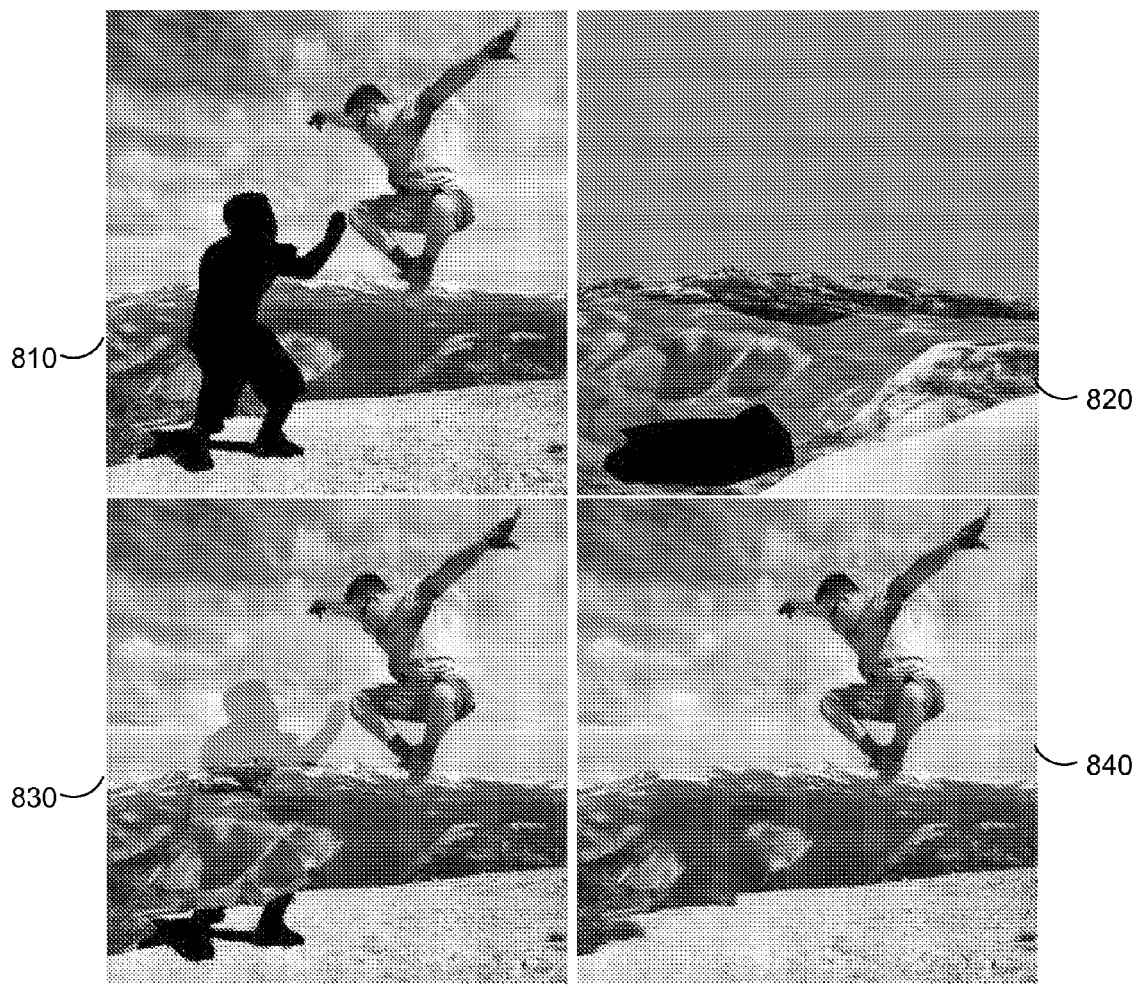
FIG. 8 is another screen shot that illustrates an exemplary image completion.

FIG. 8 is another screen shot that illustrates an exemplary image completion. Image 810 is an image having a hole that is sent to the image completion system. Image 820 is a guide image that is also sent to the image completion system. Image 820 is a synthetic image generated by a computer imaging system. The synthetic image represents a viewpoint and location similar to the content of image 810. Image 830 illustrates the image completion system layering filling the hole image 810 with information from the guide image 820. Image 840 is the completed image generated by the image completion system.

Figure 9:
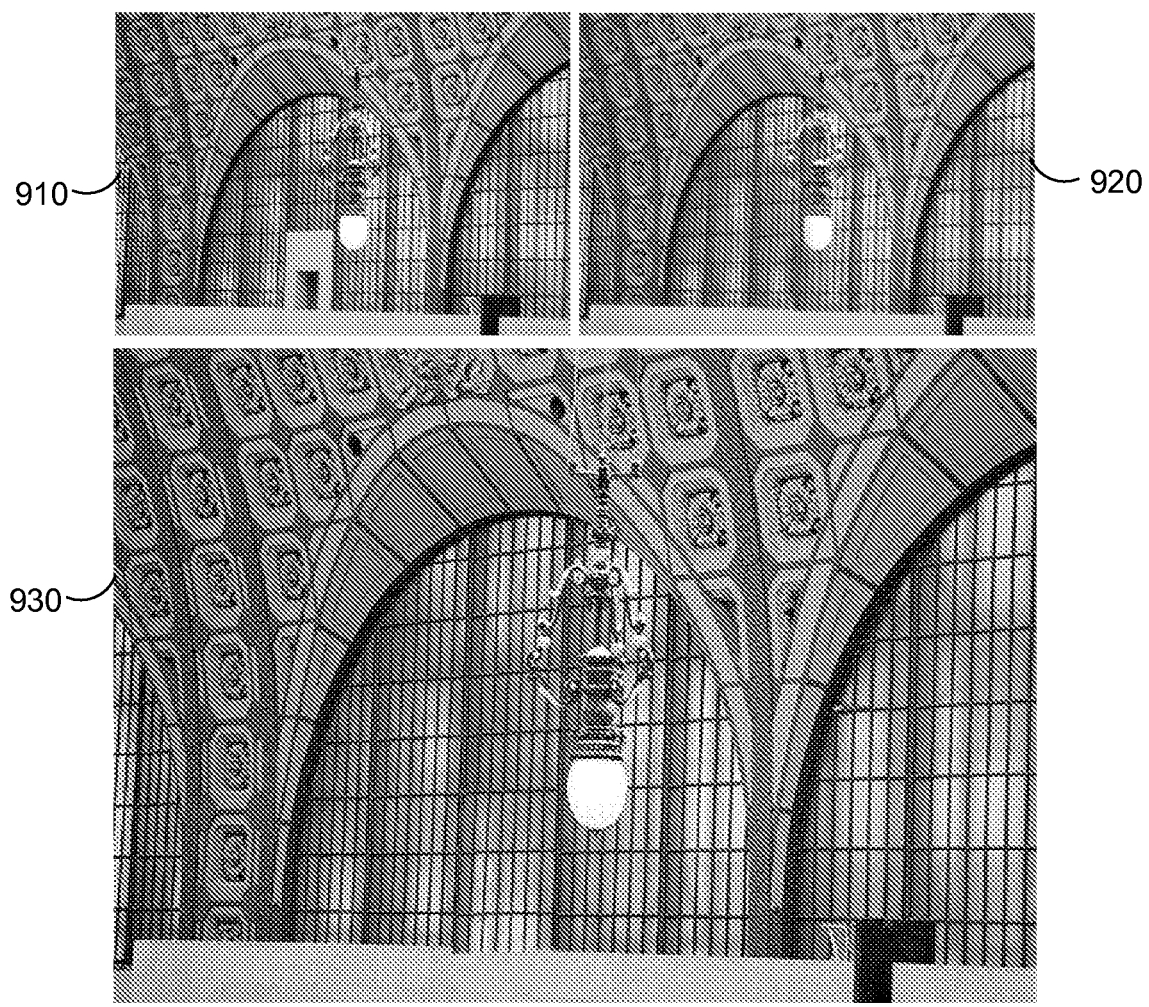
FIG. 9 is another screen shot that illustrates an exemplary image completion.

FIG. 9 is another screen shot that illustrates an exemplary image completion. The image completion system receives an image 910 having a region, i.e. an entrance, identified as a hole. The user of the image completion system may select a portion of the current image to be a guide that is utilized by the image completion system when generating a completed image that removes the identified hole. Image 920 illustrates a complete image generated by the image completion system without the guide image. The image 920 includes an artifact, i.e., warped region, that was introduced when completing image 910. Image 930 illustrates the complete image generated by the image completion system when the guide image selected by the user is utilized. The image 930 does not suffer from the artifact of image 920.

Figure 10:
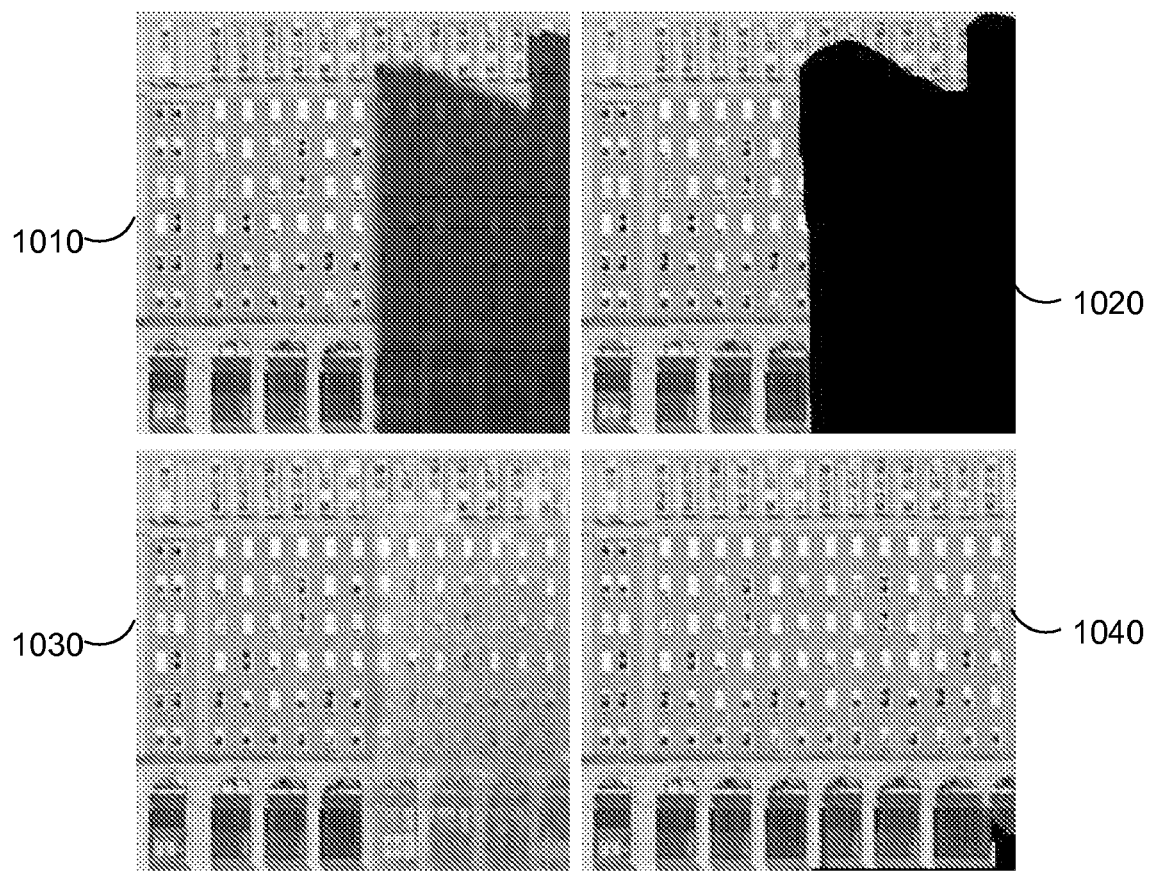
FIG. 10 is another screen shot that illustrates an exemplary image completion.

FIG. 10 is another screen shot that illustrates an exemplary image completion. The image completion system may receive images that includes holes that are identified based on a shadow included in the image. Image 1010 illustrates a shadowed image received by the image completion system. Image 1020 illustrates the image 1010 with the shadowed region identified as a hole. Image 1030 is a guide image that is based on image 1010. Image 1030 illustrates an image having an altered shadowed region of image 1010. The altered shadowed region of image 1030 is a contrast-enhanced region. The image completions system utilizes image 1030 to generate the completed image 1040 that removes the shadow from image 1010.

Figure 11:
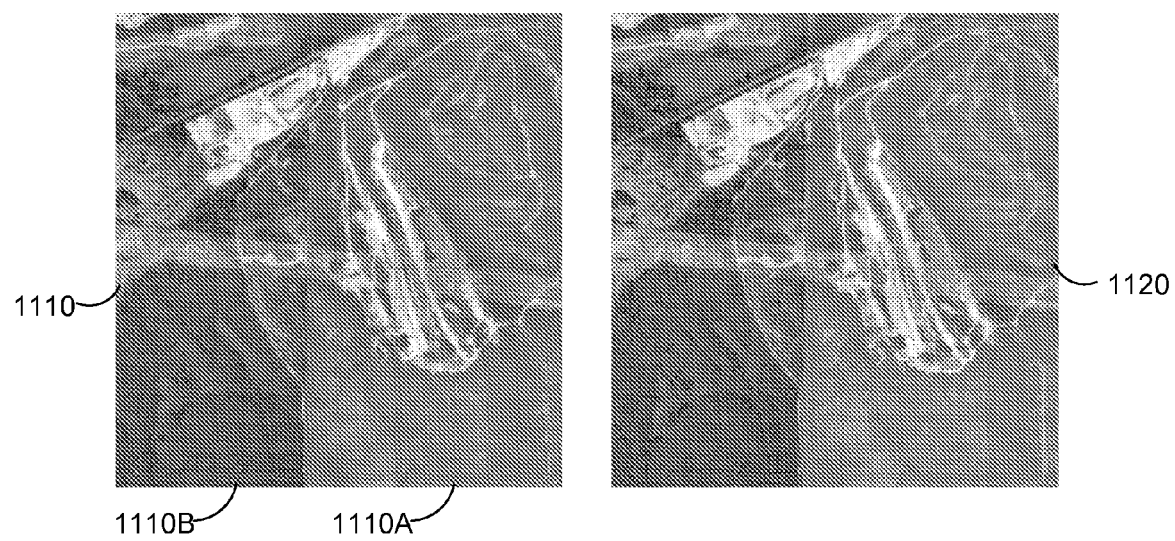
FIG. 11 is another screen shot that illustrates an exemplary image completion.

FIG. 11 is another screen shot that illustrates an exemplary image completion. The image completion system receives an image 1110 that has gray-scale component and a color component. The image 1110 may be a satellite image captured by different sources. The image completion system may utilize the gray-scale component of the image 1110 as guide image. The image completion system removes the color component of images and generates a completed image 1120 based on the guide image. The hole 1110A is the gray-scale component. The image completion system uses the guide image and the color component 110B to colorize the hole 1110A.

Figure 12:
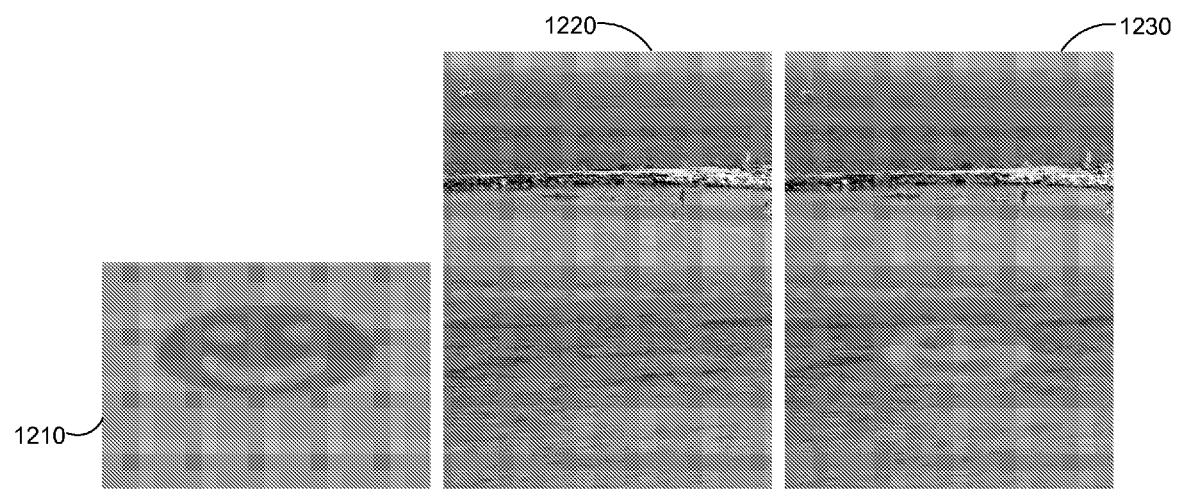
FIG. 12 is another screen shot that illustrates an exemplary image completion.

FIG. 12 is another screen shot that illustrates an exemplary image completion. The image completion system receives a guide image 1210, which illustrates a user-made guide. The image completion system also receive an image 1220 that includes a regions marked as a hole. The image completion system utilizes the guide image 1210 to fill the marked hole with the information included in the guide image 1220 to produce the completed image 1230.

Figure 13:
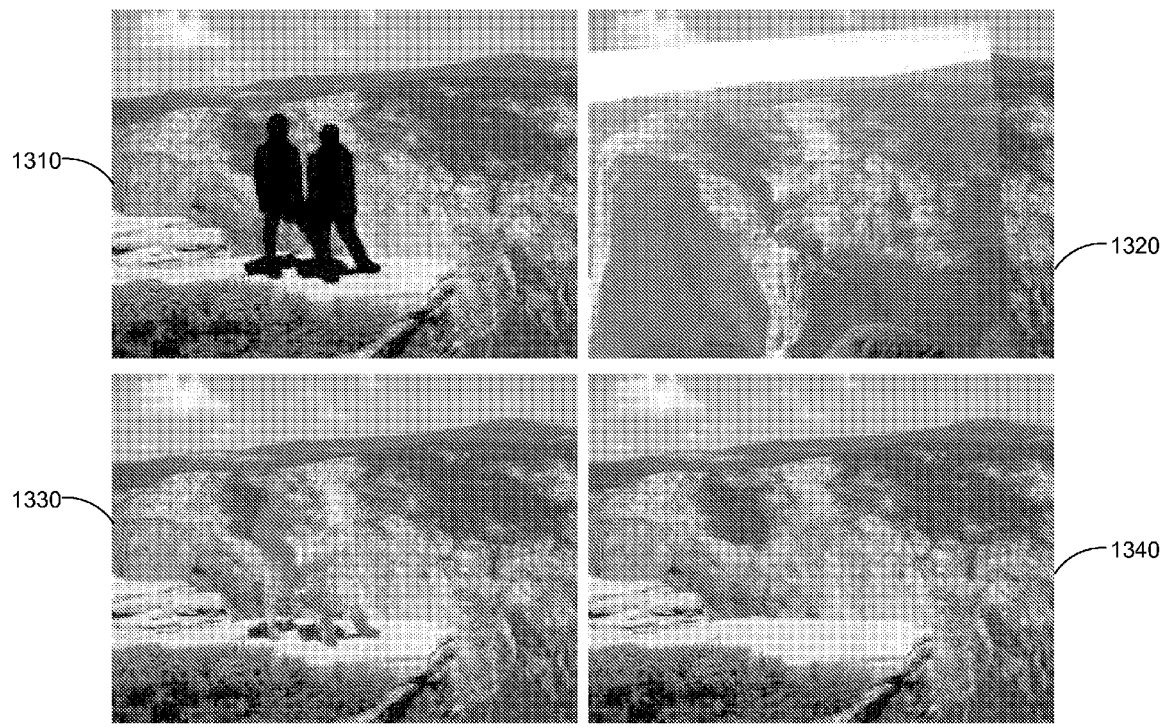
FIG. 13 is another screen shot that illustrates an exemplary image completion.

FIG. 13 is another screen shot that illustrates an exemplary image completion. The image completion system receives the image having a hole 1310. The image completion system also receives a guide image 1320, which captures the same scene, with similar alignment but different colors. The guide image 1320 was generated by a different image capturing device. The image completion system fills the hole with image information extracted from the guide image 1320 and generates a layered image 1330. The image completion system combines the image having the hole 1310 and the guide image 1320 to generate the completed image 1340.

Figure 14:
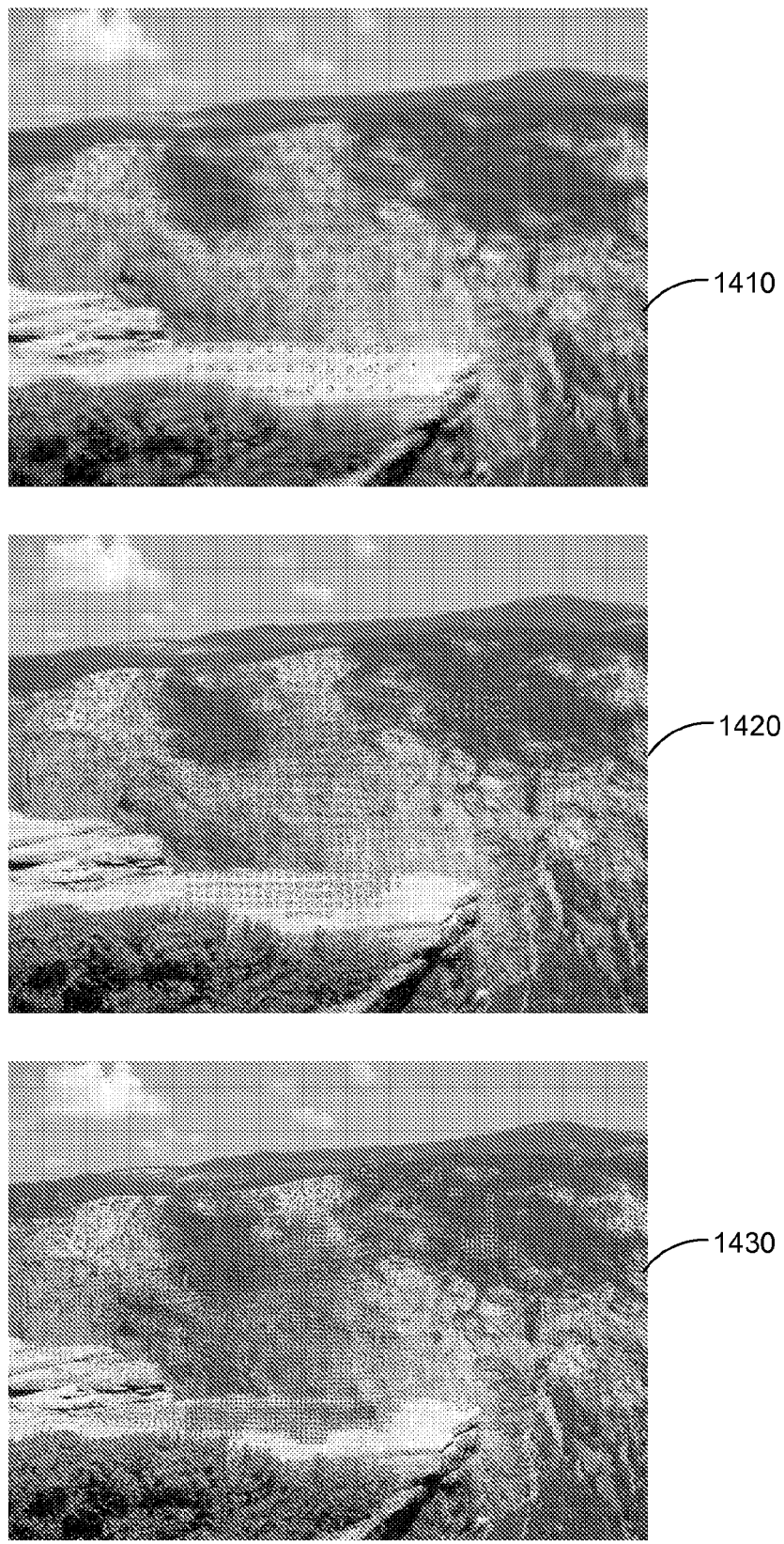
FIG. 14 is another screen shot that illustrates an exemplary image completion.

FIG. 14 is another screen shot that illustrates an exemplary image completion. The image completion system utilizes varying resolutions for images to generate the multiscale graph. Image 1410 is an image having a first resolution. Image 1420 is the same image having a second resolution that is approximately double the first resolution. Image 1430 is the same image having a third resolution that is double the second resolution. The images 1410-1430 are utilized by the image completion as levels in the multiscale graph.

The image completion system executes a single scale image completion or a multiscale image completion on the images having holes. The image completion system generates complete images that remove the holes from the images having holes. In some embodiments, the image completion system may utilize the guide image to select matching images that are utilized to the fill the holes.

Figure 15:
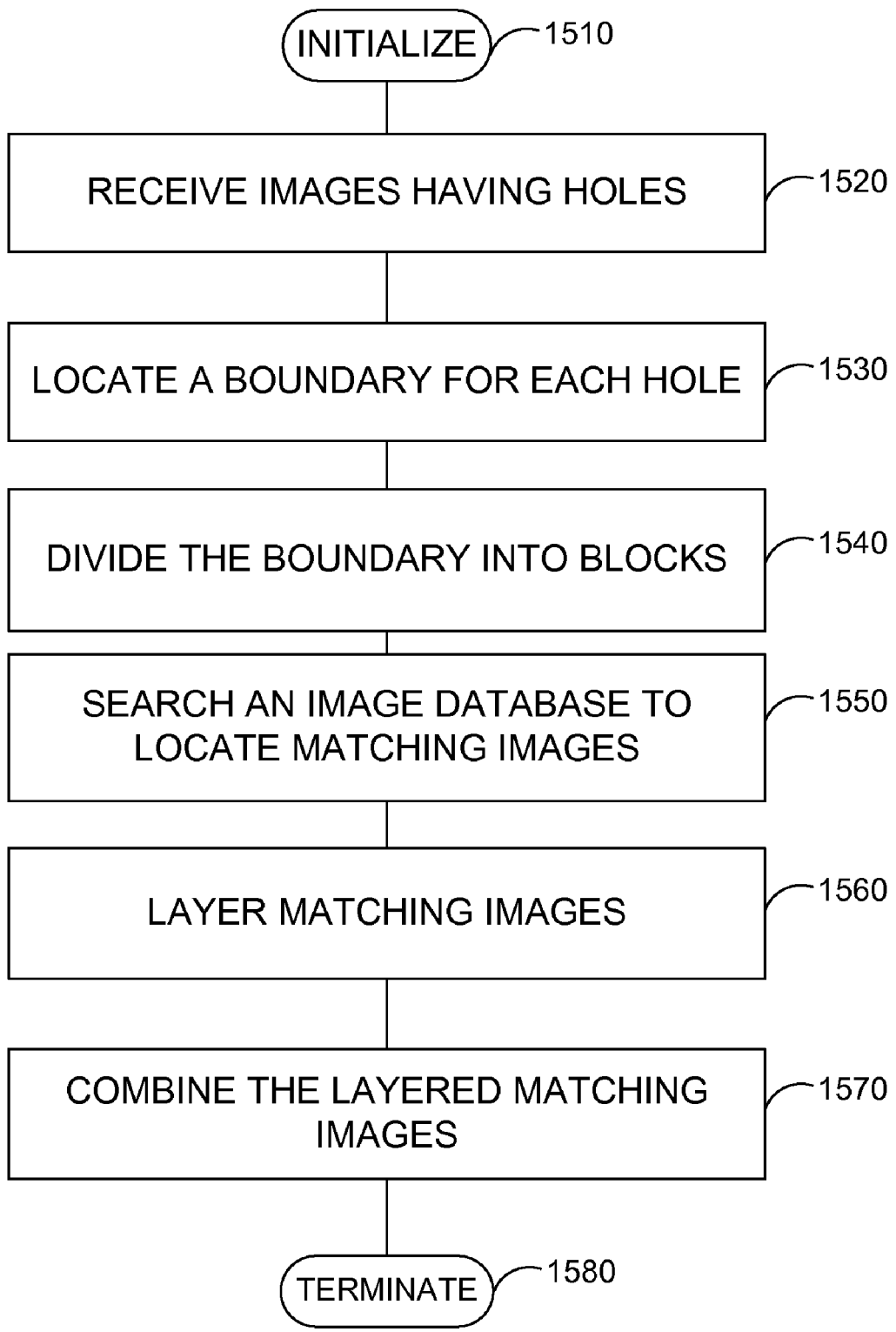
FIG. 15 is a logic diagram that illustrates an exemplary method to perform single scale image completion.

FIG. 15 is a logic diagram that illustrates an exemplary method to perform single scale image completion. The method is initialized in step 1510 when the image completion system is powered on. In step 1520, the image completion system receives images having holes. In step 1530, the images having holes are processed by the image completion system to locate a boundary for each hole. In step 1540, the image completion system divides the boundary into blocks. Each block represents image content that is proximate to each hole. In step 1550, the image completion system searches an image database to locate images that match each block. In step 1560, image completion system layers the matching images for each block to cover a portion of the hole associated with the block. In step 1570, the layered matching images are combined by the image completion system to remove the holes in the images having holes. The method ends in step 1580.

In another embodiment, the image completion system may execute multiscale image completion to generate completed images. The multiscale image completion utilizes a multiscale graph to select matching images for completing the image having holes.

Figure 16:
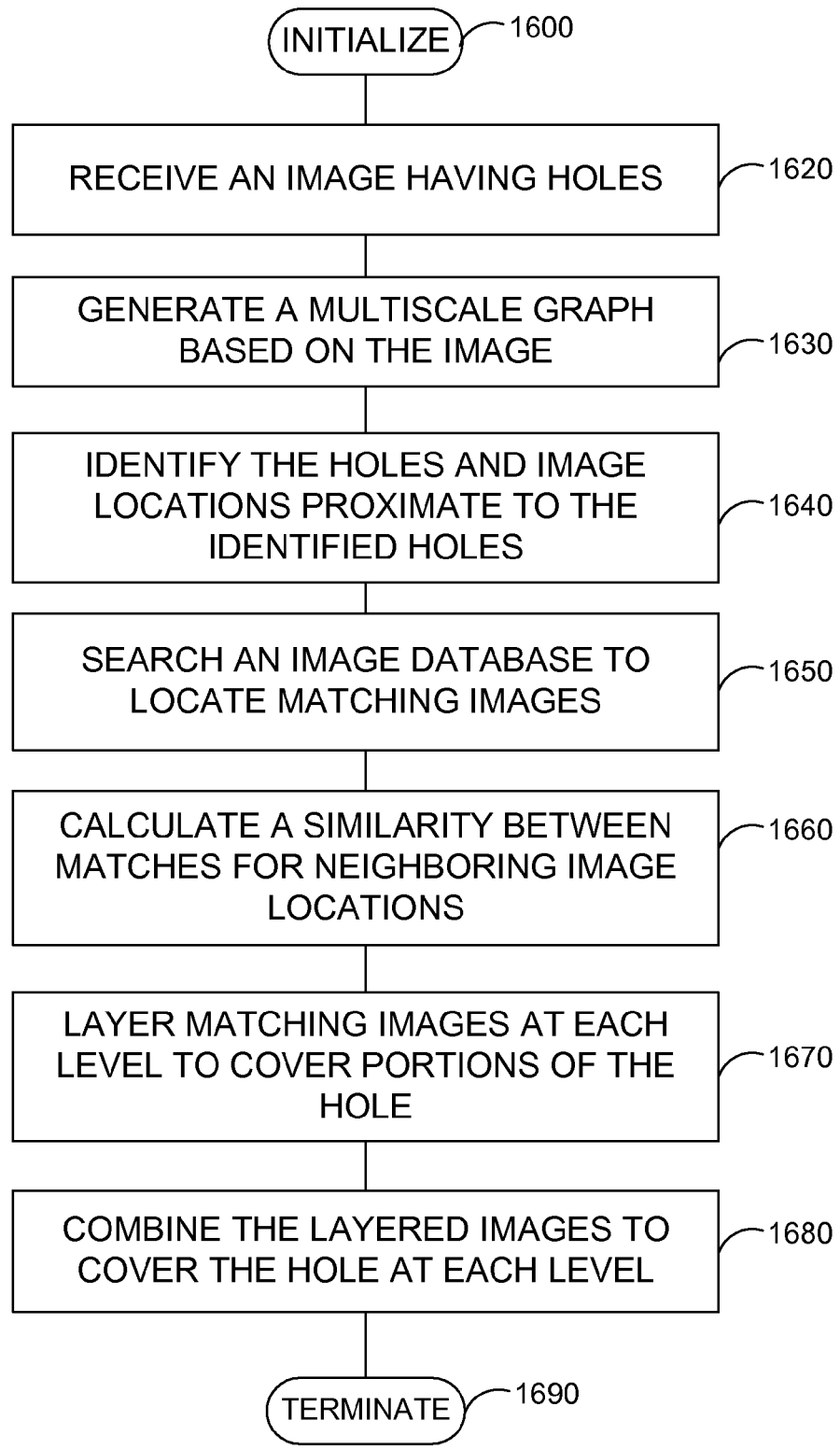
FIG. 16 is a logic diagram that illustrates an exemplary method to perform multiscale image completion.

FIG. 16 is a logic diagram that illustrates an exemplary method to perform multiscale image completion. The method is initialized in step 1600 when the image completion system is powered on. In step 1620, the image completion system receives the image having holes; In step 1630, the image completion system generates a multiscale graph based on the image. The multi-scale graph includes levels that represent different resolutions associated with the image having holes. In step 1640, the image completion system identifies, for each level, the holes and a collection of image locations that are proximate to the identified holes. In step 1650, the image completion system searches an image database to locate images that match the collection of image locations. In step 1660, the image completion system calculates, for each level, a similarity between the matching images of neighboring image locations in the collection of image locations. In step 1670, the matching images are layered, at each level, to cover portions of the identified holes based on the similarity between the neighboring image locations in the collection of image locations. In step 1680, the matching layered images are combined to cover the hole at each level. The method ends in step 1690.

In another embodiment, the image completion system may execute guided multiscale image completion to generate completed images. The multiscale image completion utilizes a multiscale graph to select matching images for completing the image having holes. The matching images that are selected by the image completion system may also have to match an guide image received by the image completion system.

Figure 17:
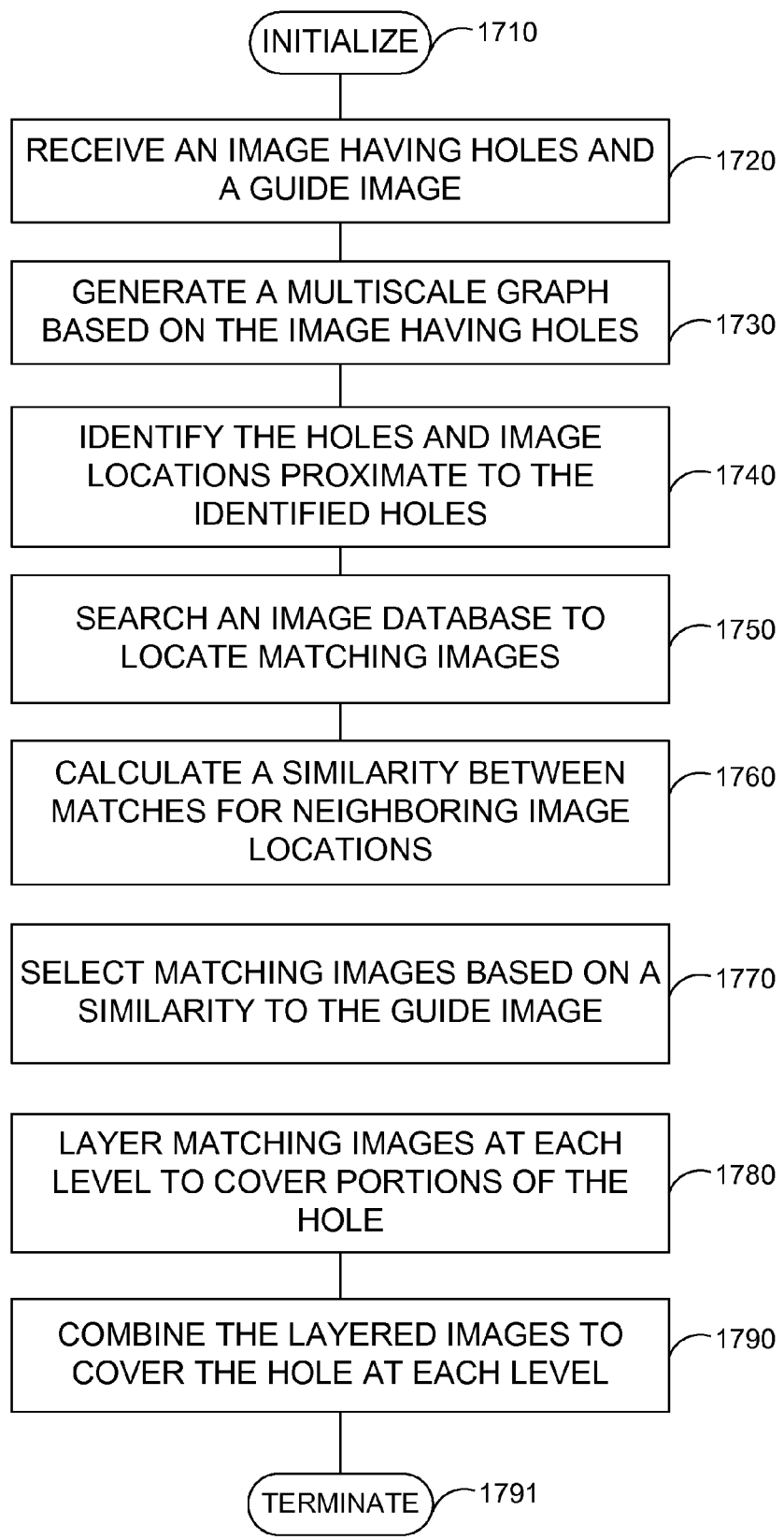
FIG. 17 is a logic diagram that illustrates an exemplary method to perform multiscale image completion with a guide image.

FIG. 17 is a logic diagram that illustrates an exemplary method to perform multiscale image completion with a guide image. The method is initialized in step 1710 when the image completion system is powered on. The image completion system receives an image having holes and a guide image in step 1720. In step 1730, the image completion system generates a multiscale graph based on the image having holes. The multi-scale graph includes levels that represent different resolutions associated with the image. In step 1740, the image completion system identifies, for each level, the holes and a collection of image locations that are proximate to the identified holes. In turn, the image completion system searches an image database to locate images that match the collection of image locations in step 1750. In step 1760, the image completion system calculates, for each level, a similarity between matching images for neighboring image locations in the collection of image locations. In step 1770, the image completion system selects matching images for each image location in the collection of image locations based on a similarity to the guide image. In step 1780, the image completion system layers the selected matching images, at each level, to cover portions of the identified hole based on the similarity between the neighboring image locations in the collection of image locations. In step 1790, the image completion system combines the layered images to cover the identified holes at each level. The method ends in step 1791.

In summary, an image completion system provides single scale image and multiscale image completion for images having holes. The image completion system utilizes various similarity functions to ensure that matching images for selected image locations smoothly fill the holes based on the local or global similarity determinations. The image completion system generates complete images that are displayed to the user of the image completion system.

The foregoing descriptions of the invention are illustrative, and modifications in configuration and implementation will occur to persons skilled in the art. For instance, while the present invention has generally been described with relation to FIGS. 1-17, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

The invention claimed is:

1. One or more computer memory devices having computer-executable instructions embodied thereon that perform a method for completing images, the method comprising:
  receiving one or more images having holes;
  locating a boundary for each hole;
  dividing the boundary into blocks;
  searching an image database to locate images that match each block;
  layering matching images for each block to cover a portion of the hole associated with the block; and
  combining the layered matching images to remove the holes in the one or more images.

2. The computer memory devices of claim 1, wherein each boundary is a perimeter of each hole in each image.

3. The computer memory devices of claim 1, wherein the blocks are portions of the image that surround the hole.

4. The computer memory devices of claim 1, wherein the matching images are resized and positioned to partially cover the hole.

5. The computer memory devices of claim 1, further comprising identifying a guide image.

6. The computer memory devices of claim 5, further comprising searching the image database to locate images that match the guide.

7. The computer memory devices of claim 6, wherein the matching images for each block comprise images that match the guide and the block.

8. The computer memory devices of claim 5, further comprising applying a modification to the guide.

9. The computer memory devices of claim 8, wherein the modification is one of obscuring the guide, altering color, altering contrast, altering gradients, or altering illumination.

10. A computer-implemented method for completing images, the method comprising:
  receiving an image having holes;
  generating a multiscale graph based on the image, wherein the multi-scale graph includes levels that represent different scales associated with the image;
  identifying, for each level, the holes and a collection of image locations that are proximate to the identified holes;
  searching an image database to locate images that match the collection of image locations;

calculating, for each level, a similarity between the matching images of neighboring image locations in the collection of image locations;

layering the matching images, at each level, to cover portions of the identified holes based on the similarity between the neighboring image locations of the collection of locations; and combining, at each level, the layered images to cover the identified holes.

11. The computer-implemented method of claim 10, wherein each level has a parent-child relationship, wherein the child level is set at a resolution that is twice a resolution at the parent level.

12. The computer-implemented method of claim 10, wherein each image location is a node in the multiscale graph, and edges link overlapping image locations at different levels in the multiscale graph and overlapping image locations at the same level in the multiscale graph.

13. The computer-implemented method of claim 10, wherein each edge is associated with a weight that represents a similarity between the nodes connected by each edge.

14. The computer-implemented method of claim 10, wherein the match is based on a similarity between a portion of the image associated with the image location and the images included in the image database.

15. A computer-implemented method for completing images, the method comprising:

receiving an image having holes and a guide image;

generating a multiscale graph based on the image, wherein the multi-scale graph includes levels that represent different scales associated with the image;

identifying, for each level, the holes and a collection of image locations that are proximate to the identified holes;

searching an image database to locate images that match the collection of image locations;

calculating, for each level, a similarity between matching images for neighboring image locations in the collection of image locations;

selecting matching images for each image location in the collection of image locations based on a similarity to the guide image;

layering selected matching images, at each level, to cover portions of the identified hole based on the similarity between the neighboring image locations in the collection of image locations; and combining, at each level, the layered images to cover the identified holes.

16. The computer-implemented method of claim 15, wherein the guide is selected from one of a synthetically rendered image, a user created image, a video frame, a photograph, or an image captured by an imaging device.

17. The computer-implemented method of claim 15, further comprising applying a modification to the guide.

18. The computer-implemented method of claim 17, wherein the modification is one of obscuring the guide, altering color, altering contrast, altering gradients, altering illumination.

19. The computer-implemented method of claim 15, wherein each image location represents a node in the multiscale graph, and edges link overlapping image locations at different levels in the multiscale graph and overlapping image location at the same level in the multiscale graph.

20. The computer-implemented method of claim 19, wherein each edge is associated with a weight that represents a similarity between the nodes connected by each edge.

* * * * *